DYNAMOELECTRIC MACHINE

Filed Jan. 14, 1957 6 Sheets-Sheet 1

Antonin J. Dvoracek
INVENTOR.

May 31, 1960 A. I. DVORACEK 2,939,069

DYNAMOELECTRIC MACHINE

Filed Jan. 14, 1957 6 Sheets-Sheet 2

Antonín I. Dvoracek
*INVENTOR.*

Antonin I. Dvoracek
INVENTOR

Antonín I. Dvoracek
INVENTOR

Antonin I. Dvoracek
INVENTOR

Antonin I. Dvoracek
INVENTOR

United States Patent Office 2,939,069
Patented May 31, 1960

2,939,069

DYNAMOELECTRIC MACHINE

Antonin I. Dvoracek, 3804 Main St., Lawrence Park Township, Erie County, Pa.

Filed Jan. 14, 1957, Ser. No. 634,057
3 Claims. (Cl. 322—57)

The well known rotary amplifiers, amplidyne and rototrol, are widely used for regulating or maintaining one magnitude, e.g., voltage, speed, position, etc.; however, very often there are secondary requirements together with the primary ones already mentioned. E.g., in addition to the primary requirement of maintaining constant voltage, a secondary requirement demands the limiting of the main current. The machines mentioned, and others, are not able to fulfill both requirements and, therefore, additional devices are needed, as the current limit rototrol or a special rectifier bridge.

The object of this invention is to provide a machine which is able to maintain one quantity within one region of operation and to limit another quantity within the remaining working region.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
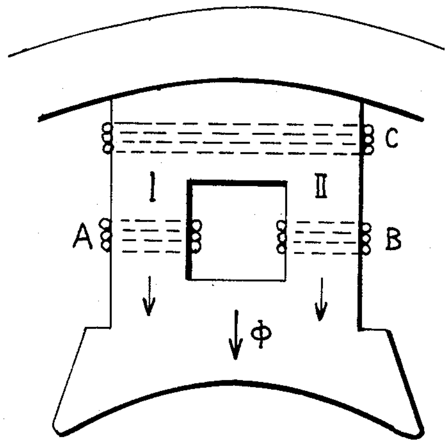
Fig. 1 shows one way of splitting the stator magnetic circuit by means of holes in poles and the arrangement of coils.

Figs. *8a* and *8b* shows different arrangements of coils on a pole body by Fig. 1.

Figs. *9a* and *9b* show different arrangement of coils in a four pole generator with pole bodies by Fig. 1 as equivalent.

Figure 10:
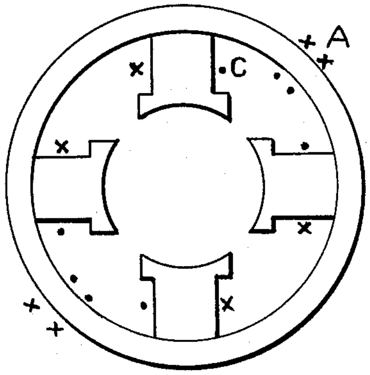

Fig. 10 shows the stator arrangement functionally equivalent to that of Figs. *9a* and *9b*, but poles without holes and coils A wound around frame branches.

Figure 11:
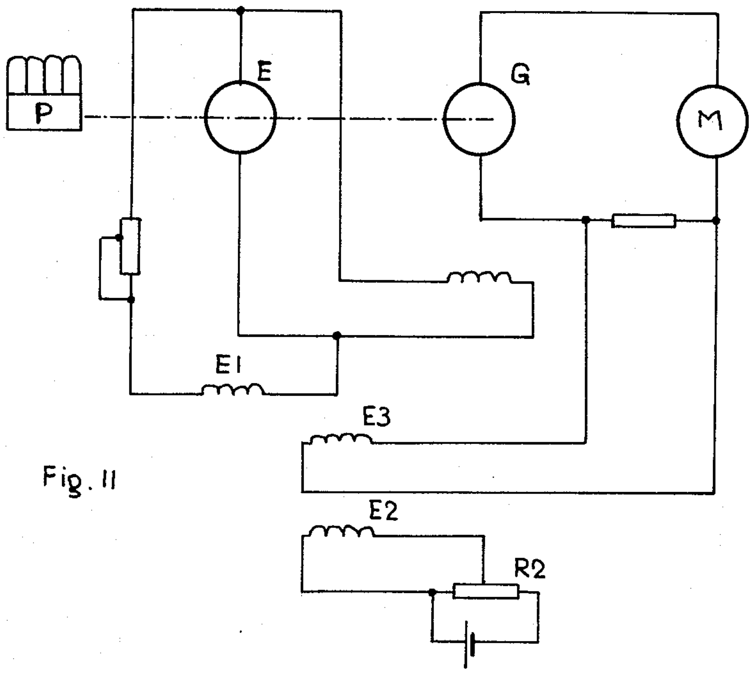

Fig. 11 shows a diagram where the invented generator is used as generator exciter of a diesel-electric drive.

Figure 12:
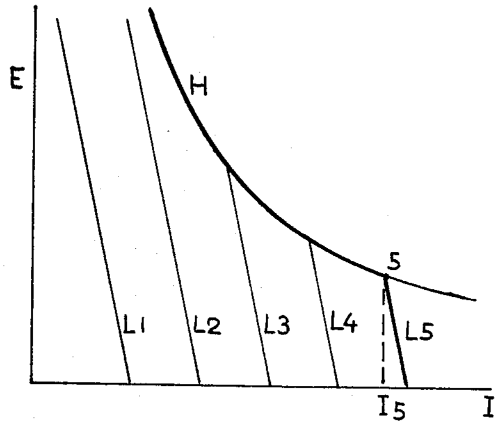

Fig. 12 is a plot of the main generator voltage against its current of the arrangement of Fig. 11.

Now with more specific reference to the drawings, the main poles of the machine have holes in their axes as shown in Fig. 1 so that the magnetic flux is divided on a part of its path passing through columns I and II which are equal. Each of the columns I and II is wound with an equal winding marked A and B. The split core windings A and B are connected in series in such a way that one exerts a M.M.F. of the sense given in Fig. 1 by the arrow. The other acts in the opposite sense, i.e., against the arrow. The poles are also provided with a winding C which is wound around the entire main pole core.

Figure 2:
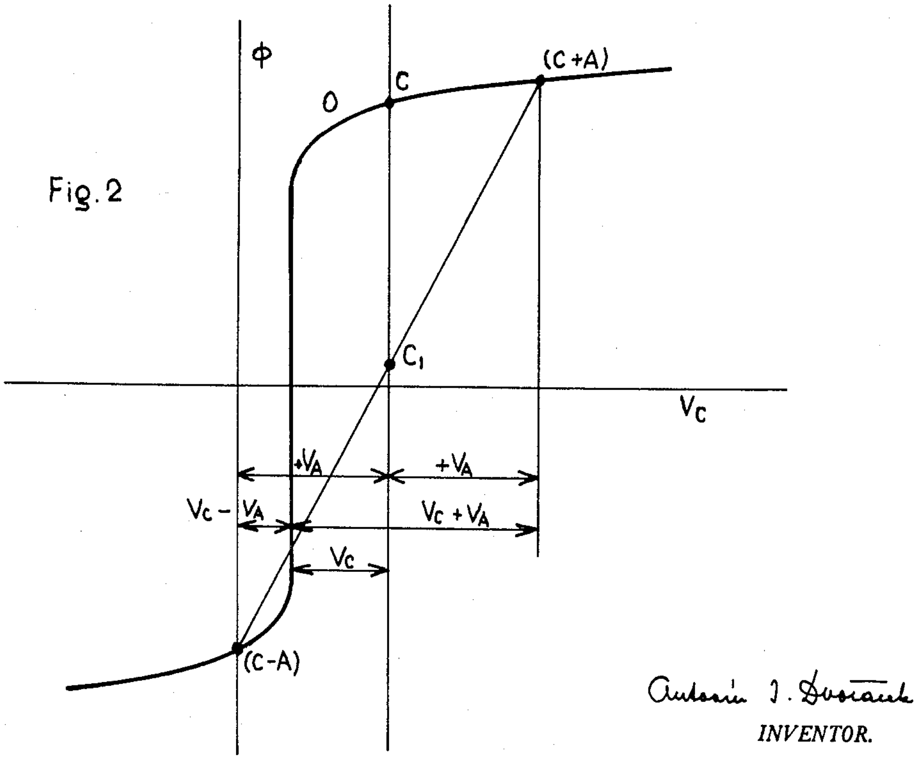
Figs. 2, 3, 4 are plots of magnetic flux versus M.M.F., or of the armature E.M.F. versus exciting current, showing the principle on which the invention is based.
Figure 3:
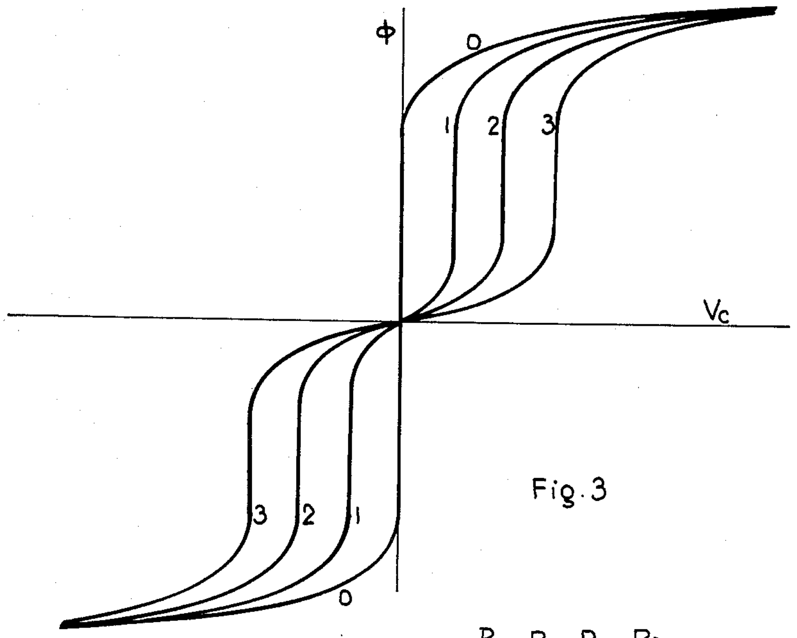

To determine the magnetic characteristic of the machine, the characteristic of the couple of the columns I and II is first determined. When the split core windings A and B carry no current, the plot of the total magnetic flux Φ (through both the columns) against the necessary M.M.F. $V_C$ along the columns (supplied by the winding C) is the curve 0 in Fig. 2. When current flows through the split core windings A and B, the windings exert M.M.F.'s $+V_A$ and $-V_A$ which are superposed on the M.M.F. $V_C$ of the winding C so that the resultant M.M.F. amounts to $V_C+V_A$ along one column while it amounts to $V_C-V_A$ along the other column. The respective fluxes through the singular columns are given in Fig. 2 by halves of the ordinates of the points $C+A$ and $C-A$, the resultant flux of both the columns being given as the ordinate of point $C_1$. To a given constant $V_A$ and variable $V_C$, the locus of points $C_1$ as curve 1 in Fig. 3 is obtained. For current through the windings A and B which is twice or three times as strong as the one considered, the respective plots 2, 3, etc. are found. The plot 0 of Fig. 3 is the same as that of Fig. 2.

Figure 4:
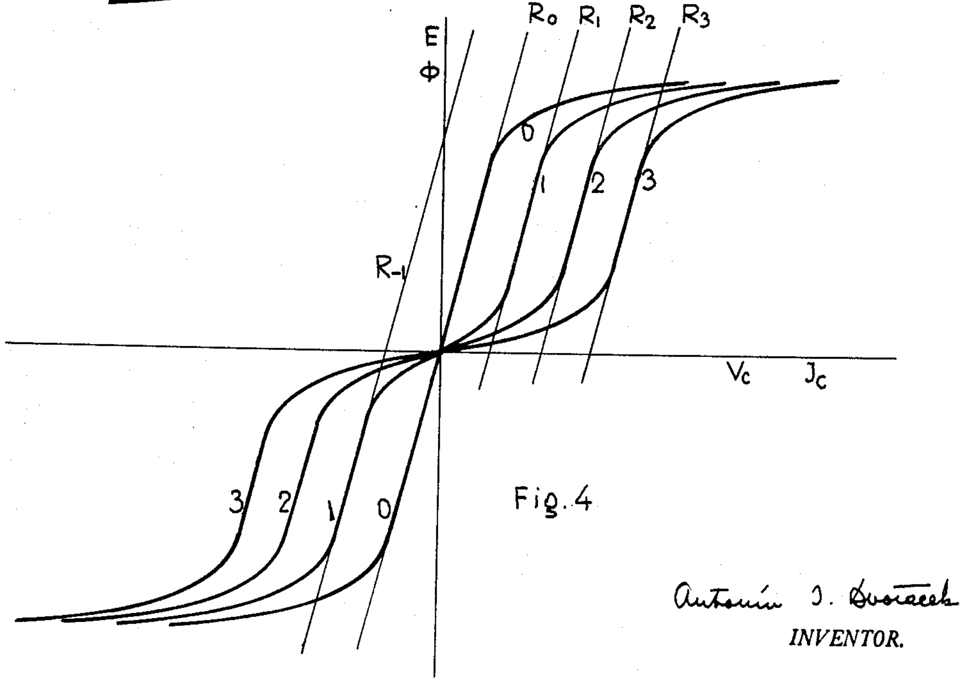

The characteristic of the entire magnetic circuit will be obtained by adding the necessary M.M.F.'s of the remaining part of the magnetic circuit, this being assumed unsaturated, to the M.M.F.'s given by Fig. 3. As a result, the family of curves is obtained as shown in Fig. 4. Each of the curves 0, 1, 2, and 3 is the plot of the total magnetix flux against the M.M.F. of the coil C. The singular curves correspond to various values of the M.M.F. of the split core windings A and B, the plot 0 relating to zero M.M.F. of the split core windings and the further curves 1, 2, and 3 relating to respective rising M.M.F.'s of these windings.

In another scale, the curves of Fig. 4 are plots of the armature voltage E against the exciting current in winding C, the parameter being the current through the split core windings A and B. Thus, the armature voltage of this machine is determined by both the current of the main exciting winding C and the current of the split core windings A and B, being independent, however, of the polarity of the latter.

Figure 5:
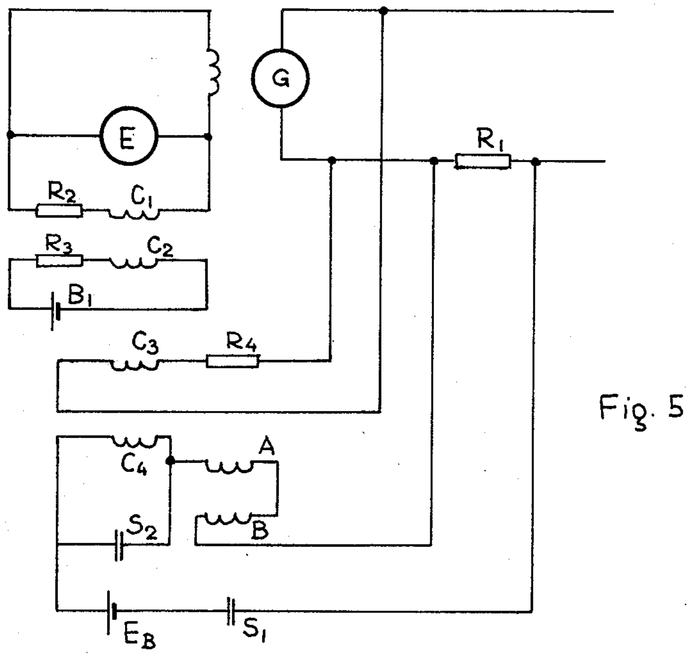
Fig. 5 shows an example of the use of the invented generator as exciter E of a main generator G.

The function of this machine will now be considered when used as exciter E (see Fig. 5) of a D.C. generator G to maintain generator voltage constant. It will be assumed that the switch $S_1$ is opened so that only main coils $C_1$, $C_2$, and $C_3$ (wound around the entire pole core) are in operation. Coil $C_1$ is a critically adjusted self-exciting winding. By critical adjustment is meant such a choice of value of resistor $R_2$ that the resistance line of the corresponding exciting circuit (coil $C_1$ and resistor $R_2$) coincides with the machine characteristic as indicated in straight line $R_0$ compared to curve 0 in Fig. 4. Coil $C_2$ supplies a constant, reference M.M.F., which is matched by the M.M.F. of the feedback (generator voltage) coil $C_3$. This known arrangement maintains generator voltage constant without regard to the main current I so that the resulting outer characteristic (the plot of the generator voltage E against its current I) is the straight line $E_0$ in Fig. 6.

The split core coils A and B are set in operation by closing switches $S_1$ and $S_2$, coil $C_4$ being thus short circuited. Due to the constant E.M.F. $E_B$, the current in the split core coils is proportional to the deviation of the main current I from a certain value $I_0$. If the generator current is $I=I_0$, all the conditions remain as before and the state is characterized by point $I_0$, $E_0$ in Fig. 6.

When, however, the generator current adopts another value larger or smaller than $I_0$, a current sets in through the split core coils, causing a shift of the exciter characteristic to a position such as that given by 1, 2, and 3 in Fig. 4. Hence, the characteristic moves away from the resistance line $R_0$ and, therefore, the generator voltage drops to such a value that the difference of the M.M.F.'s of the coils $C_2$ and $C_3$ compensates for the divergence of the characteristic and the resistance line. Thus, the external generator characteristic will be given by the broken line $E_1$. The line is broken in consequence of the absolute value effect of the split core windings.

The same arrangement will now be considered but with the switch $S_2$ closed. The coil $C_4$, being wound around the entire pole core, causes an inclination of the external characteristic of Fig. 6 in a manner similar to that of a series coil of a D.C. compound generator. As a result, the asymmetrically broken line $E_2$ is obtained as a characteristic.

Figure 7:
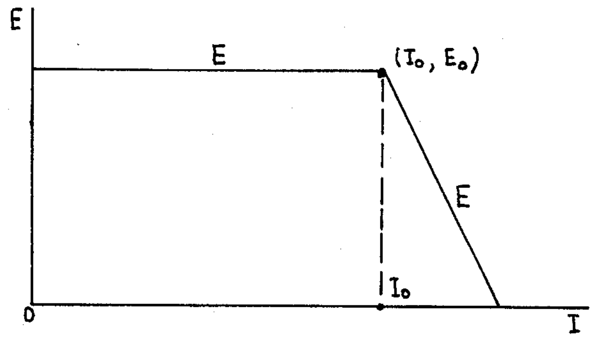
Fig. 7 shows the same with the invented exciter maintaining constant voltage of a generator and limiting its current.

Finally, choosing the same number of turns of coil $C_4$ as for the coils A and B, the characteristic given in Fig. 7 is obtained. Here, for generator currents I smaller than $I_0$, the generator voltage remains constant. In the range of currents stronger than $I_0$, the voltage drops as the current rises.

Thus, maintaining one quantity constant and limiting another quantity by means of one regulating machine alone are achieved.

The internal process of the machine thus adjusted is as follows: At $I=I_0$, the characteristic 0 in Fig. 4 and the coinciding resistance line $R_0$ represent an astatic state. Coils $C_2$ and $C_3$ exert their regulating effect holding the generator voltage constant. If the generator current drops to a certain value, both the characteristic and the resistance line are shifted to the right side by the same distance, e.g. to 1 and $R_1$, respectively, remaining in coincidence, thus enabling the same regulating process as before. If the generator current should rise from $I_0$, the characteristic would be shifted to the right side, e.g., to position 1. The resistance line, however, would be shifted to the left side, e.g., to position $R_1$, because the shift would be caused by the coil $C_4$ wound around the entire pole core. Therefore, the generator voltage would drop until the difference of the M.M.F.'s of the coils $C_2$ and $C_3$ would restore the equilibrium by shifting the resistance line to position $R_1$.

Figure 6:
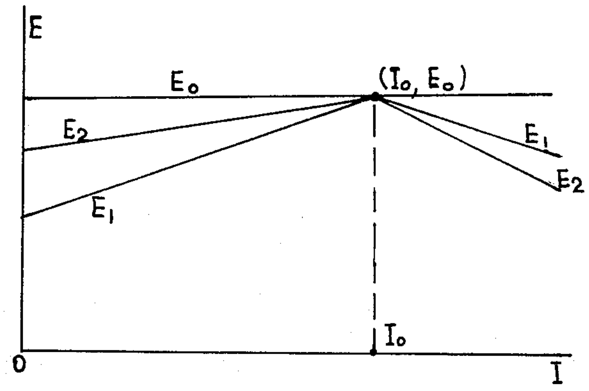
Fig. 6 shows plots of voltage against current of a generator excited by the invented exciter.
Figure 8A:
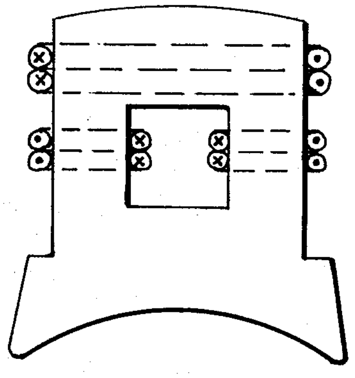
Figure 8B:
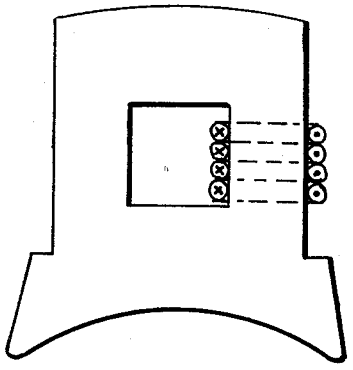
Figure 9A:
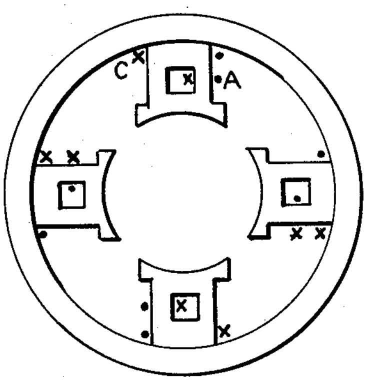
Figure 9B:
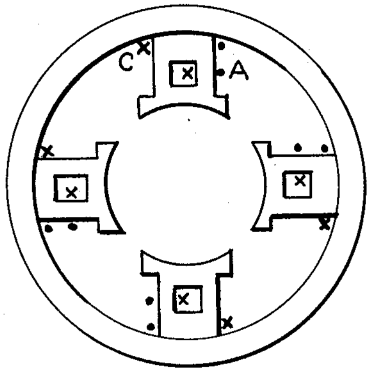

Referring now to the inner arrangement of the machine operation according to Fig. 6, because the shifting coil $C_4$ and the split core coils A and B have the same number of turns here, the original arrangement of Fig. 8*a* may be replaced by the arrangement in Fig. 8*b* containing only one coil or one winding. The total stator arrangement of a four pole machine may be performed by either the elements shown in Fig. 9*a* or Fig. 9*b*. In Figs. 9*a* and 9*b*, the designation C indicates various windings (as were $C_1$, $C_2$, and $C_3$ in Fig. 4) wound around the entire pole core and A indicates the joint split core winding which replaces coils $C_4$, A, and B. The marked polarities correspond to the resultant M.M.F.'s while the machine is working within the region of $I<I_0$ of Fig. 7.

The split part of the magnetic circuit need not be part of the main pole but the frame may be used as well for the purpose. Starting from the arrangement in Fig. 9*b*, an equivalent arrangement is found in Fig. 10 wherein split core coils are wound around the frame core.

Bearing in mind the described operation of the machine, it is noted that there is one case of astaticism in the coincidence of the characteristic and resistance line 0 with $R_0$, 1 with $R_1$ etc. over the region of the first polarity (herein called the positive one) of the split core winding. The second case of astaticism is defined at the zero M.M.F. of the split core winding because a small negative M.M.F. of the split core winding makes the working point move uniformly downward until it reaches the negative part of the characteristic.

The machine operates as an astatic generator but only with the armature polarity prescribed by the split core winding and, therefore, it may be called the polarized astatic generator (polarized rototrol). Not only external quantities, as voltage and current in the example, can be the object of regulation of the suggested machine but, also, internal quantities, e.g., the speed of the machine itself may be regulated thereby as the next example shows.

This is the case of diesel-electric power transmission where maintaining constant speed of the prime mover and limiting the main current shall be achieved. The arrangement is shown in Fig. 11 wherein the axle motor M is fed by the generator G which is excited by the exciter E. Both the generator and the exciter are driven by the prime mover P. The main winding $E_1$ of the exciter (wound around the entire core) is critically adjusted at the chosen prime mover speed. The joint split core winding consists of two sets of coils; viz: set $E_2$ having an adjustable constant current flowing therethrough and set $E_3$ energized proportionally to the main current.

When the main current is smaller than $I_5$, the resultant M.M.F. of the joint split core windings $E_2$ and $E_3$ is positive. Consequently, the internal characteristic coincides with the resistance line and the exciter behaves like a normal unsaturated machine with critically adjusted self-excitation. Here, small variations in speed cause substantial variations in the exciter voltage, generator voltage, and generator output. Consequently, at negligible speed variations of the prime mover, the generator output is practically constant. Thus, the external characteristic of the generator is the well known constant power hyperbola H in Fig. 12.

At the working point 5 of the hyperbola, the resultant M.M.F. of the joint split core windings $E_2$ and $E_3$ is zero. For main current greater than $I_5$, this M.M.F. reverses its polarity, making the internal characteristic and the resistance line of the exciter tend to separate, hence rapidly lowering the exciter voltage and the generator voltage. The graphical expression of this is the portion $L_5$ of the generator characteristic. At other positions of the potentiometer $R_2$ are obtained the respective generator characteristics consisting of one of the straight lines $L_1$—$L_4$ and the hyperbola H.

The foregoing specification sets for the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A D.C. generator for regulating one quantity and limiting another quantity, said generator having part of its stator magnetic circuit split into two parallel branches, said stator being provided with two sets of coils, the first set of coils being wound around the entire pole cores, the second set of coils being wound around said branches of magnetic circuit, said first set of coils comprising self exciting field critically adjusted by means of a tuning resistor, said first set of coils comprising other fields necessary for regulating one quantity, said second set of coils being influenced by the quantity which is to be limited.

2. A D.C. generator according to claim 1 having a part of its stator magnetic circuit split into two branches by means of holes in the pole cores.

3. A D.C. generator according to claim 1 having stator magnetic circuit of conventional design and using the frame branches as the cores wound around by the second set of coils.

References Cited in the file of this patent

UNITED STATES PATENTS

| | | |
|---|---|---|
| 2,697,807 | Pell | Dec. 21, 1954 |
| 2,761,082 | Chang | Aug. 28, 1956 |

FOREIGN PATENTS

| | | |
|---|---|---|
| 18,280 | Great Britain | Aug. 12, 1911 |
| 242,368 | Great Britain | Nov. 12, 1925 |